US006982928B2

(12) United States Patent
Al-Ali

(10) Patent No.: US 6,982,928 B2
(45) Date of Patent: Jan. 3, 2006

(54) SEISMIC P-WAVE VELOCITY DERIVED FROM VIBRATOR CONTROL SYSTEM

(75) Inventor: Mustafa Naser Al-Ali, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 10/781,130

(22) Filed: Feb. 17, 2004

(65) Prior Publication Data

US 2005/0041527 A1 Feb. 24, 2005

Related U.S. Application Data

(60) Provisional application No. 60/464,315, filed on Apr. 21, 2003, now abandoned.

(51) Int. Cl.
*G01V 1/28* (2006.01)

(52) U.S. Cl. ............................ 367/54; 367/50; 702/18

(58) Field of Classification Search .................. 367/54, 367/75, 50; 702/6, 18
See application file for complete search history.

(56) References Cited

U.S. PATENT DOCUMENTS

| | | | | | |
|---|---|---|---|---|---|
| 2,087,120 | A | | 7/1937 | Salvatori et al. | 367/53 |
| 2,229,191 | A | | 1/1941 | Schaeffer et al. | 367/54 |
| 2,231,575 | A | | 2/1941 | Gardner | 367/56 |
| 2,354,548 | A | | 7/1944 | Ricker | 367/75 |
| 2,390,187 | A | | 12/1945 | Sharpe | 367/75 |
| 3,003,577 | A | | 10/1961 | Itria | 367/75 |
| 3,351,899 | A | | 11/1967 | Luehrmann et al. | 367/23 |
| 3,794,827 | A | * | 2/1974 | Widess | 367/54 |
| 4,069,471 | A | * | 1/1978 | Silverman | 367/54 |
| 4,101,867 | A | * | 7/1978 | Martin | 367/54 |
| 4,110,729 | A | * | 8/1978 | Vreugde | 367/63 |
| 4,422,165 | A | | 12/1983 | Thomas et al. | 367/40 |
| 4,750,157 | A | * | 6/1988 | Shei | 367/45 |
| 4,893,694 | A | | 1/1990 | Houck et al. | 181/111 |
| 4,972,384 | A | | 11/1990 | Williams | 367/75 |
| 5,010,976 | A | | 4/1991 | Airhart | 181/108 |
| 5,587,968 | A | * | 12/1996 | Barr | 367/75 |
| 6,424,920 | B1 | * | 7/2002 | Osypov | 702/18 |
| 6,611,764 | B2 | * | 8/2003 | Zhang | 702/18 |
| 2003/0117894 | A1 | * | 6/2003 | Curtis et al. | 367/58 |

OTHER PUBLICATIONS

Mustafa Naser Ali AL-Ali, "Use of Vibrator Performance Data to Improve Near-Surface Velocity Determination," May, 2002, King Fahd University of Petroleum and Minerals.*

* cited by examiner

*Primary Examiner*—Bernarr E. Gregory
*Assistant Examiner*—Scott A. Hughes
(74) *Attorney, Agent, or Firm*—Abelman, Frayne & Schwab

(57) ABSTRACT

P-wave velocity in a near-surface region of a land area is estimated from a combination of seismic data based upon waves in the near-surface region generated in response to a shock in each of a plurality of upholes drilled in the land area and vibrator dynamic data generated in the near-surface region in response to vibrator action on the land area.

33 Claims, 13 Drawing Sheets

NEAR-SURFACE VARIATIONS

VIBRATOR AND EARTH DYNAMICS

SEISMIC P-WAVE VELOCITY DERIVED FROM VIBRATOR CONTROL SYSTEM

CROSS-REFERENCE TO RELATED APPLICATIONS

This application claims priority to U.S. Ser. No. 60/464,315 filed Apr. 21, 2003, now abandoned, the disclosure of which is herein incorporated by reference.

FIELD OF THE INVENTION

This invention relates to seismic exploration, and more particularly to the mapping of underground features for oil and gas exploration.

BACKGROUND OF THE INVENTION

Reliably estimating near-surface P-wave (longitudinal or compression wave) velocity is one of the key problems in land seismic exploration. Conventionally, uphole surveys have been used to acquire this near-surface velocity information. However, in the presence of rapidly varying near-surface geology, this method of estimation is inherently uncertain due to the sparse uphole sampling grid.

Other conventional indirect methods to determine the near surface layers velocity model have included refraction and shallow reflection surveys. These indirect measurements for near surface properties determination are conducted separately from the surveys directed towards imaging deep layers. Such refraction and shallow reflection surveys normally require further constraining factors to validate their results, and data from upholes has therefore been used for this extra validation.

Correspondingly, data from refraction and shallow reflection surveys has been used to interpolate between sparsely located upholes for improving the near surface velocity model. The velocity of the near surface layer is estimated from the direct arrivals from these two techniques. Sometimes other kinds of data are used for interpolation, such as ground penetrating radar (GPR) or resistivity. All these techniques are good aids for interpolation between upholes, but they add an extra cost component to the survey.

A good knowledge of near-surface velocity macro model is vital for hydrocarbon reservoir exploration and characterization that utilize seismic data. This model is crucial for statics and depthing. However, the complexities of near surface layers make its determination, using direct measurements via uphole surveys, economically prohibitive. The problem that geophysicists face is how to interpolate between sparse near-surface velocity well controls knowing the fact that near-surface velocity varies laterally with lithology that does not equally vary in all directions. Therefore, techniques are needed to estimate near-surface velocity using available data in order to minimize the associated risk resulting from an incomplete knowledge of the near-surface velocity model.

SUMMARY OF THE INVENTION

It is therefore an object of the present invention to provide a method for estimating near-surface P-wave velocity that avoids the above-described difficulties of the prior art.

The above and other objects are achieved by the present invention which, in one embodiment, is directed to a method of estimating P-wave velocity in a near-surface region of a land area, comprising the steps of gathering control data for the near-surface region, gathering vibrator dynamic data generated in the near-surface region in response to vibrator action on the land area, and estimating the P-wave velocity in response to both the control data and the vibrator dynamic data.

In a preferred embodiment, the control data is seismic data for the near-surface region generated in response to a shock in each of a plurality of upholes drilled in the land area, and the vibrator dynamic data includes both ground stiffness data and ground viscosity data.

This approach of the present invention resolves the complexity of near-surface velocity model determination in areas characterized by sparse uphole controls and rapidly varying velocity. Moreover, the proposed technique does not add any cost for additional data acquisition because the needed data is readily available with seismic data acquired using vibrators. In addition, the proposed method requires less time than any of the conventional near-surface macro model estimation techniques.

These and other objects, features and advantages of the present invention will be apparent from the following detailed description of the preferred embodiments taken in conjunction with the following drawings, wherein like reference numerals denote like elements.

DETAILED DESCRIPTION OF THE PREFERRED EMBODIMENTS

Figure 1:
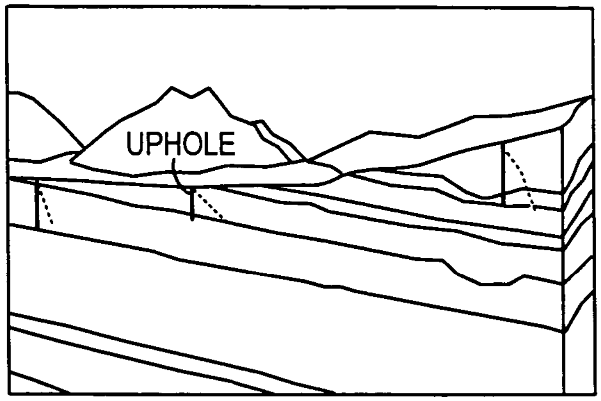
FIG. 1 is a schematic cross section of an area to be surveyed having three upholes.

The present invention combines data from two sources to provide an improved estimate of the P-wave (compression wave) velocity in the near-surface layer. The first type of data is from upholes, also known as shot holes, that are dug in the surface in an array spanning the area to be surveyed. A shock wave is generated on the surface and received by detectors attached to the bore-hole wall at pre-specified intervals. The obtained time versus depth data are used to estimate the P-wave velocity. FIG. 1 illustrates in schematic cross-section an area to be surveyed using data from three illustrated upholes, and also indicates some of the variations in underground formations at the near-surface. Methods of using the data from such upholes for P-wave velocity estimation are well known and will be described herein only to the extent required to explain the present invention.

Figure 2:
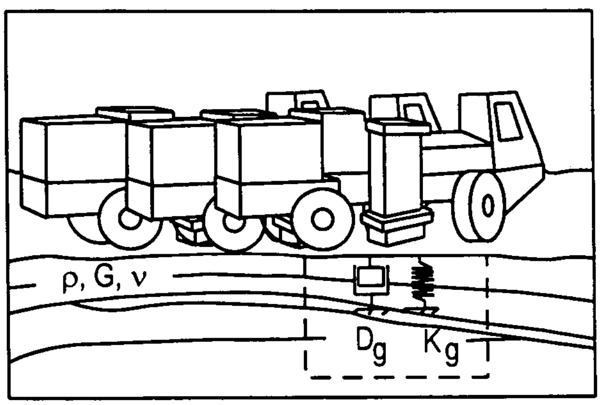
FIG. 2 illustrates a conventional vibrator assembly mounted on a truck.

The second type of data is from the vibrators that are conventionally used to measure vibrator and earth dynamics such as ground stiffness and ground viscosity. Vibrator estimated ground parameters and their respective geographic locations are routinely recorded in conjunction with the normal seismic acquisition of data for quality control purposes. FIG. 2 illustrates a conventional vibrator assembly mounted on a truck, with a schematic indication of variables measured in response to the vibrations impressed by these assemblies.

Figure 3:
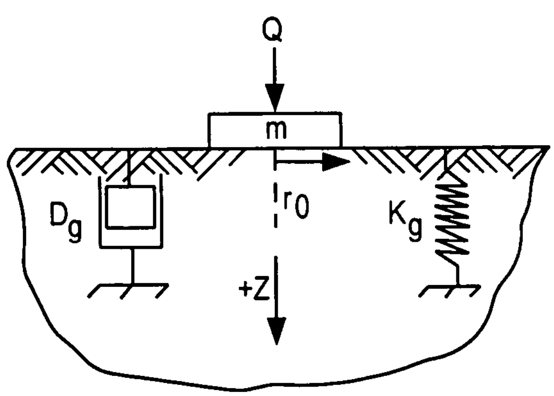
FIG. 3 illustrates a basic model of vibrator theory.

A brief description of the underlying theory will now be given. The basic model for the vibrator data comes from the Lysmer equations, which describe the dynamic response of a rigid circular footing to vertical motion, as in the model shown in FIG. 3. This model shows a rigid circular footing of radius $r_0$ and mass m coupled to the elastic half-space and put into oscillation by an external periodic force Q, i.e. the action of the vibrator.

Ground stiffness $K_g$ and ground viscosity $D_g$ are well known from Lysmer's Relations, as follows:

$$K_g = \frac{4Gr_0}{1-\nu}$$

where G is the shear modulus and ν is Poisson's ratio. The units of $K_g$ are (N/m).

$$D_g = \frac{3.4r_0}{(1-\nu)}(\rho G)^{1/2}$$

where ρ is the mass density. The units of $D_g$ are (N-sec/m).

Poisson's ratio ν, which is a parameter in both equations, can be expressed in terms of $V_p$ (compression wave propagation velocity) and $V_s$ (shear wave propagation velocity) as follows:

$$\nu = \frac{0.5-(V_s/V_p)^2}{1-(V_s/V_p)^2}$$

Also, the shear modulus G can be expressed in terms of mass density ρ and $V_s$ by $$V_s=(G/\rho)^{1/2}$$

Combining these equations yields $$K_g=8r_0\rho(V_s^2-(V_s^4/V_p^2)) \text{ and}$$

$$D_g=6.8r_0\rho(V_s-(V_s^3/V_p^2))$$

Because $K_g$ and $D_g$ depend on three interdependent parameters $V_p$, $V_s$ and ρ, relating each of these ground parameters independently to the P-wave velocity $V_p$ is not possible without knowledge of a further parameter.

This further parameter comes from the critical damping for vertical oscillation in viscously damped systems defined such that the free displacement reaches equilibrium without oscillation. It is given by $$D_c=2(K_g m)^{1/2}$$

The critical damping is expressed in terms of $D_g$ and a dimensionless mass ratio such that $$\frac{D_g}{D_c} = \frac{0.425}{(B_z)^{1/2}}$$

$B_z$ is the dimensionless mass ratio introduced by Lysmer given by $$B_z = \frac{1-\nu}{4} * \frac{m}{\rho r_0^3}$$

Knowing both $K_g$ and $D_g$, the equations yield $$\frac{\rho}{1-\nu} = \frac{D_g^2}{2.89K_g r_0^3}$$

Substitution into the definition of $K_g$ finally yields $$V_s=0.85K_g r_0/D_g$$

Figure 5:
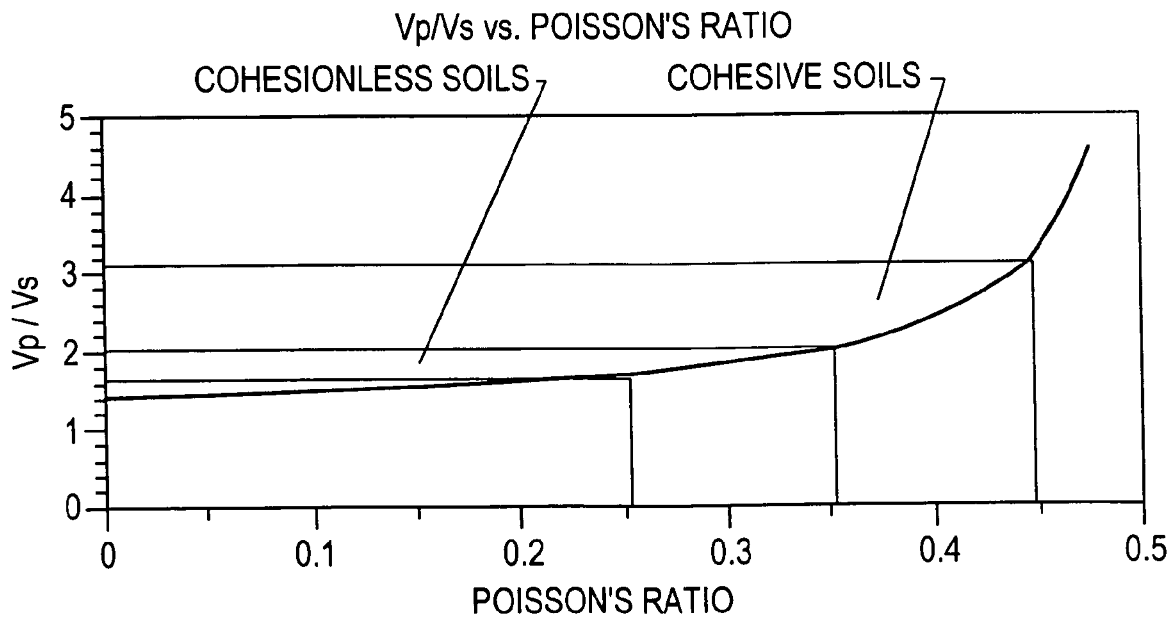
FIG. 5 illustrates an idealized relationship of $V_{p/Vs}$ to Poisson's ratio.

The previous derivation shows that both $K_g$ and $D_g$ can be used to eliminate the dependence on density and Poisson's ratio to compute $V_s$. An idealized relationship of $V_p/V_s$ to Poisson's ratio is shown in FIG. 5. In general, Poisson's ratio for cohesionless soils ranges from 0.25 to 0.35 and for cohesive soils from 0.35 to 0.45. The corresponding $V_p/V_s$ ratio will vary from 1.73 to 2.08 for cohesionless soils and from 2.08 to 3.32 for cohesive soils. The median of these ratios is 2.3. This value is used as a reasonable approximation of the $V_p/V_s$ ratio for the near surface materials that will be sensed by the vibrator, as not all of these materials will be cohesive or cohesionless, but rather a combination of the two.

Therefore, in accordance with the present invention, $V_s$ obtained from $K_g$ and $D_g$ will be multiplied by 2.3 and then correlated with $V_p$, seeking a linear relation.

Table 1 below shows the correlation coefficients between collocated upholes and vibrator velocity attribute measurements at different iso-depths from the surface in a specified region selected for a test of the present invention.

TABLE 1

| Depth (m) | 10 | 20 | 30 | 40 | 50 | 60 |
|---|---|---|---|---|---|---|
| Vp | 0.71 | 0.71 | 0.69 | 0.66 | 0.56 | 0.52 |

The correlation coefficients pertaining to this attribute are greater than 0.65 down to a depth of 40 meters and decrease with depth, which confirms predictions. This due to the fact that estimates derived from vibrator measurements are only influenced by a relatively thin section of the earth surface. There is an abrupt change in correlation coefficients occurring at a depth of 50 meters, indicating that the depth of influence cutoff is between 40 and 50 meters.

Figure 4:
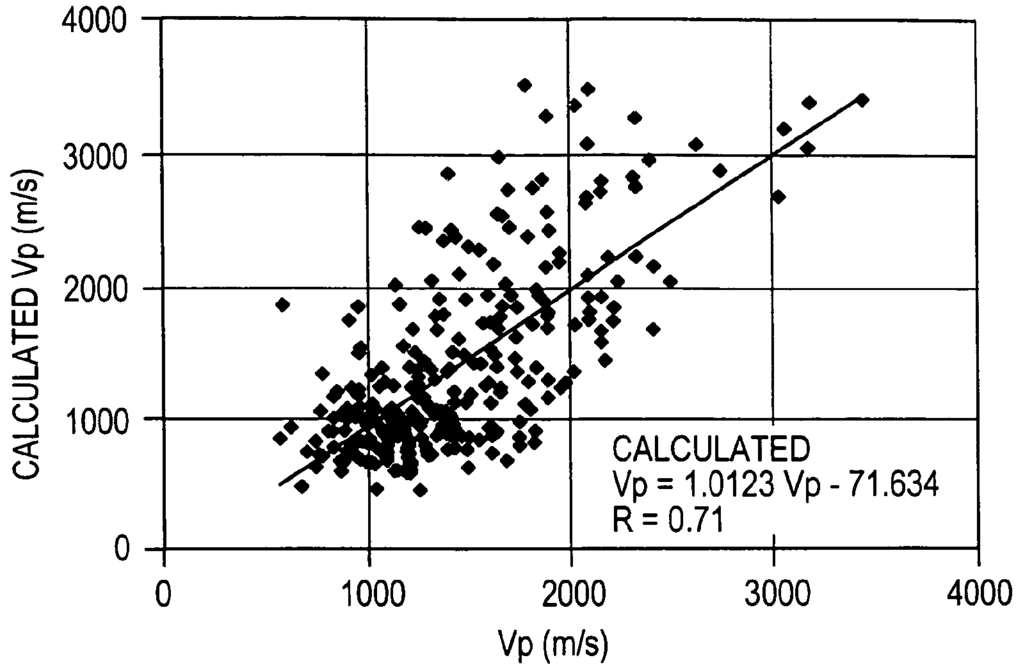
FIG. 4 is a crossplot of calculated $V_p$ versus 20 meter iso-depth uphole velocities.

FIG. 4 shows a crossplot of estimated $V_p$ and 20 meter iso-depth uphole velocities. The exhibited linear relation confirms the predictions. The plotted $V_p$ is obtained by multiplying $V_s$ by 2.3, for the reasons given above. This fits the data well where the slope of the best fitted line is approximately 1.

As described below, the method in accordance with the present invention was subjected to two field tests in order to evaluate its performance relative to other methods of velocity estimation.

In the first test, uphole data of each iso-depth down to 50 meters was integrated with the vibrator velocity attribute using linear relations with the correlation coefficients shown in Table 1. Before integration, the vibrator velocity attribute values with kriged in order to form an exhaustive data set. Then the integration was done using Collocated Cokriging. The second test is described later in this specification.

Thus, the present invention is directed to a novel technique, called herein "Vibrator Attribute Leading Velocity Estimation" (VALVE), for improving near-surface velocity determination using vibrator baseplate estimates of ground parameters. The first step is to develop a hypothesis for deriving P-wave velocity attribute from vibrator baseplate data. Geostatistics in data interpolation and integration is then applied. This is followed by generating an integrated 3D near-surface velocity model using data from a 2,450 square kilometer area for the test. Finally, the results of applying this model on seismic data stacks are illustrated.

Vibrator Baseplate Measurements As described above, while vibrating at any location on the ground, the vibrator exerts a force that is opposed by a counter force from the ground. Simply, as it pushes against the earth, the vibrator feels the earth response to the applied force through the movements of the baseplate. Therefore, knowing the dynamics of the vibrator, that is the reaction mass and baseplate accelerations, estimates can be obtained for the underlying earth properties. Modern vibrator control systems estimate the actual ground force generated by vibrators relative to the theoretical input signal through measurements made at different parts of the vibrator, and thus, produce estimates of ground parameters at each vibration point (VP).

As discussed in detail above, the theory of vibrations on the earth surface is well studied in the field of civil engineering, with the vertical oscillation of a footing resting on the surface of an elastic half-space being the civil engineering analogue of the vibrator and earth's dynamics. This theoretical framework is used to derive a velocity attribute of the near-surface from vibrator ground parameters measurements. This attribute has the same spatial sampling rate as the source grid in the seismic survey, which is considerably finer than the uphole grid.

Figure 6:
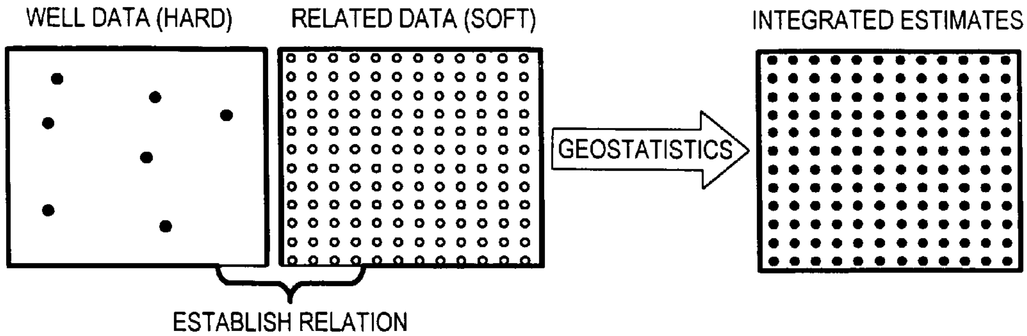
FIG. 6 illustrates a geostatistical integration model.

Geostatistical Estimation Tools Geostatistics is routinely used to predict reservoir parameters based on what is usually a limited number of available wells. Besides of describing spatial and temporal patterns, it is a good tool for multi-scaled data integration. In accordance with the present invention, the spatially well-sampled 3D seismic data is efficiently integrated with sparsely but vertically well sampled reservoir properties using geostatistical techniques (FIG. 6). In this case, seismic attributes are integrated with direct measurements, made in the wells, to improve the reliability of reservoir properties estimates away from the wells. Consequently, this integration approach can be applied at any level within the earth layers (for example to improve a near surface layers velocity model obtained from direct measurements such as upholes) provided that other related data components are available.

Kriging is the basic geostatistical interpolation tool. It is a local estimation technique that provides unbiased estimates with minimum variance. It is also known as BLUE (Best Linear Unbiased Estimator) that provides optimal interpolation. It is unlike traditional interpolation techniques that depend on data values, because it incorporates a model of spatial correlation which makes it reliably honor the geologic features.

Improvements in estimating missing spatial or temporal points are obtained when the primary measurements are integrated with related secondary attributes. In practice, the primary measurements are sparsely sampled compared to the densely sampled secondary information. There are different forms of kriging that allow performing this task. Among these are kriging with strata, simple kriging with varying local means, kriging with an external drift and cokriging. The latter besides kriging will be used to build the subsequent near-surface velocity models in the embodiments of the present invention.

VALVE Near-Surface 3D Velocity Model Building

Figure 7:
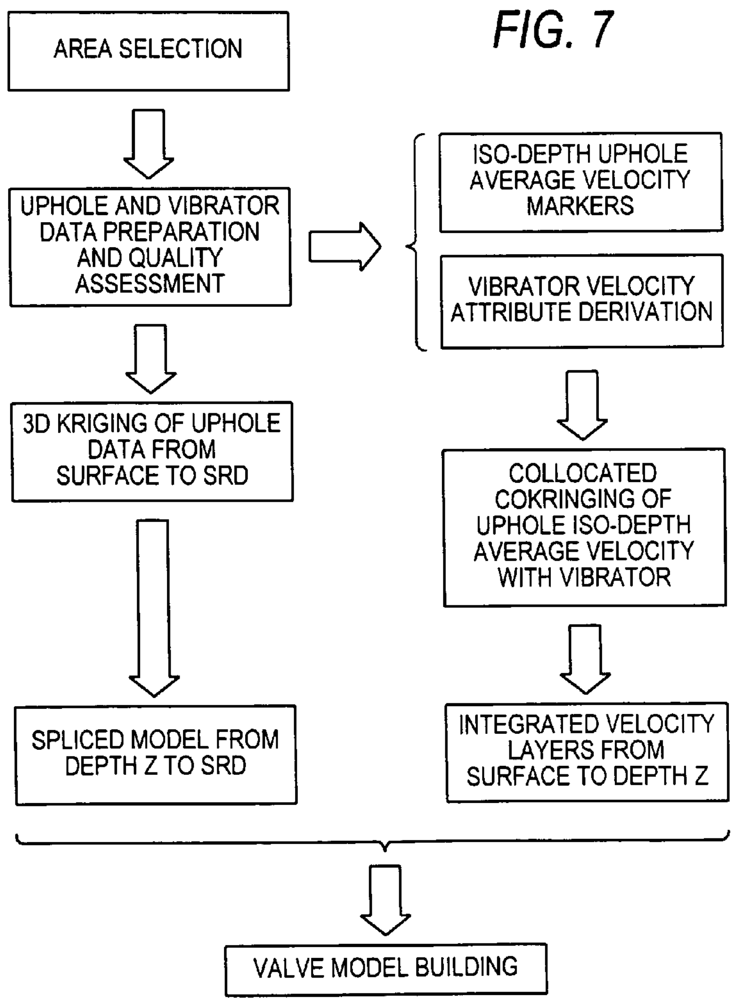
FIG. 7 illustrates the steps of VALVE model building in accordance with the present invention.

Near-surface 3D velocity model building using VALVE in accordance with the present invention consists of five steps, generally shown in FIG. 7:

Step 1) Data base building. Three data components are required to generate a VALVE model. These are:

a) Adequate upholes to ensure good statistical representation of the study area near-surface velocity variations.

b) Vibrator baseplate measurements of ground parameters: stiffness and viscosity.

c) Surface elevation information.

It should be noted that the third data component is required if such a model is intended to be used for calculating seismic statics from surface to Seismic Reference Datum (SRD).

Step 2) Uphole data preparation and quality assessment. Upholes represent the source of primary P-wave velocity data in accordance with the invention. In the test of an embodiment as described herein, 463 upholes were available in the study area with variable penetration depths. 444 of these were used as part of the primary dataset used to construct the VALVE model. The remaining 19 served as a control data set to compare against the predicted layer velocities.

A depth versus time plot was constructed for each uphole to assist in detecting anomalous samples. Theoretically, travel time should increase with depth. However, this criterion is sometimes not satisfied due to various reasons. For example, cavities or fractures introduced by the drilling process can result in anomalous travel times. Another source of error could be experimental such as a wrongly picked arrival time or an incorrect depth. Errors caused by these factors normally manifest themselves on the depth-time plots, and thus can be corrected provided that enough control points are available.

In general, uphole surveys cannot provide perfect results. For instance, lateral changes in near-surface geology can cause inaccurate measurements depending on the magnitude of the source or the receiver offset from the well. The assumption of a straight raypath from source to receiver can be another source of errors, especially with heterogeneous near-surface layers. Nevertheless, when the source offset from the borehole is relatively small, as was true in the test, the magnitude of these errors is minimal.

Finally, average P-wave velocities in iso-depth markers from the surface are calculated from the uphole data. These uphole average velocity markers are used for subsequent correlation and integration with the derived velocity attribute.

Step 3) Vibrator Ground Parameters Preparation and Quality Assessment

Figure 8:
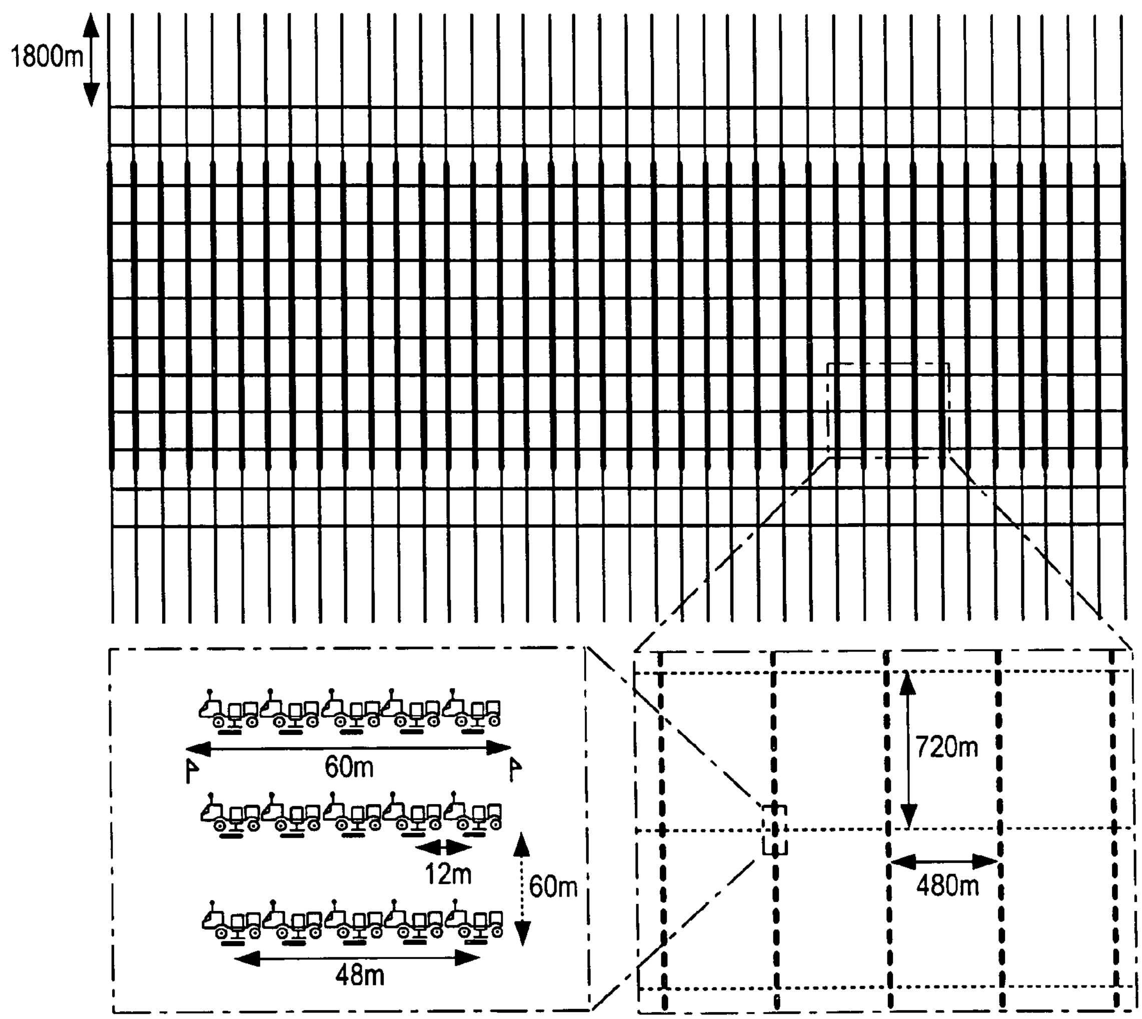
FIG. 8 illustrates the vibrator data geometry of a first test of the present invention.

Vibrator estimated ground parameters and their respective geographic locations are usually readily available from seismic surveys that use vibrators as sources. The measurements used herein were obtained from a 3D seismic survey conducted in the study area. The spatial distribution of such data was the same as the distribution of vibration points (VP's) in the survey design (FIG. 8). The VP's were acquired along 720 meters apart east-west lines and 480 meters apart north-south lines. The VP's along each line were spaced at 60 meter intervals. Five vibrators were used at each VP spaced by a 12 meter interval following an east-west pattern.

Before deriving a velocity attribute from the vibrator data, the quality of the latter must be assessed. Since vibrator data are gathered in time-order, a time series presentation may give some indication about the behavior of these data. If the common cause of variations of vibrator measurements is due to the reaction to surface conditions, then the majority of the vibrators operating at the same time would provide approximately similar measurements. On the other hand, any specific variation in this process is assumed to be mainly due to problems associated with particular vibrators. Problems occurring with vibrators could be mechanical (i.e. related to the vibrator itself) or instrumental (related to the control system). Data measured by a vibrator that has a problem will deviate from the majority pattern, and data belonging to any vibrator that showed obvious deviation from the majority were removed from the analyzed data set.

Acceptable measured data occur within three standard deviations from both sides of the mean. Therefore, pursuant to the previous visual quality assessment step, data samples that fall outside the three-sigma limits were removed from the data set. This operation was performed also on a daily basis. Following this step, the P-wave velocity attribute in the elastic half-space is calculated from vibrator ground parameters as discussed above. Next, a spatial smoother with 960 and 1440 meters lengths, respectively in the X and Y directions, was applied to the derived velocity attribute. Finally, the attribute's values were kriged in order to form an exhaustive data set.

Step 4) VALVE Model Building

Figure 9:
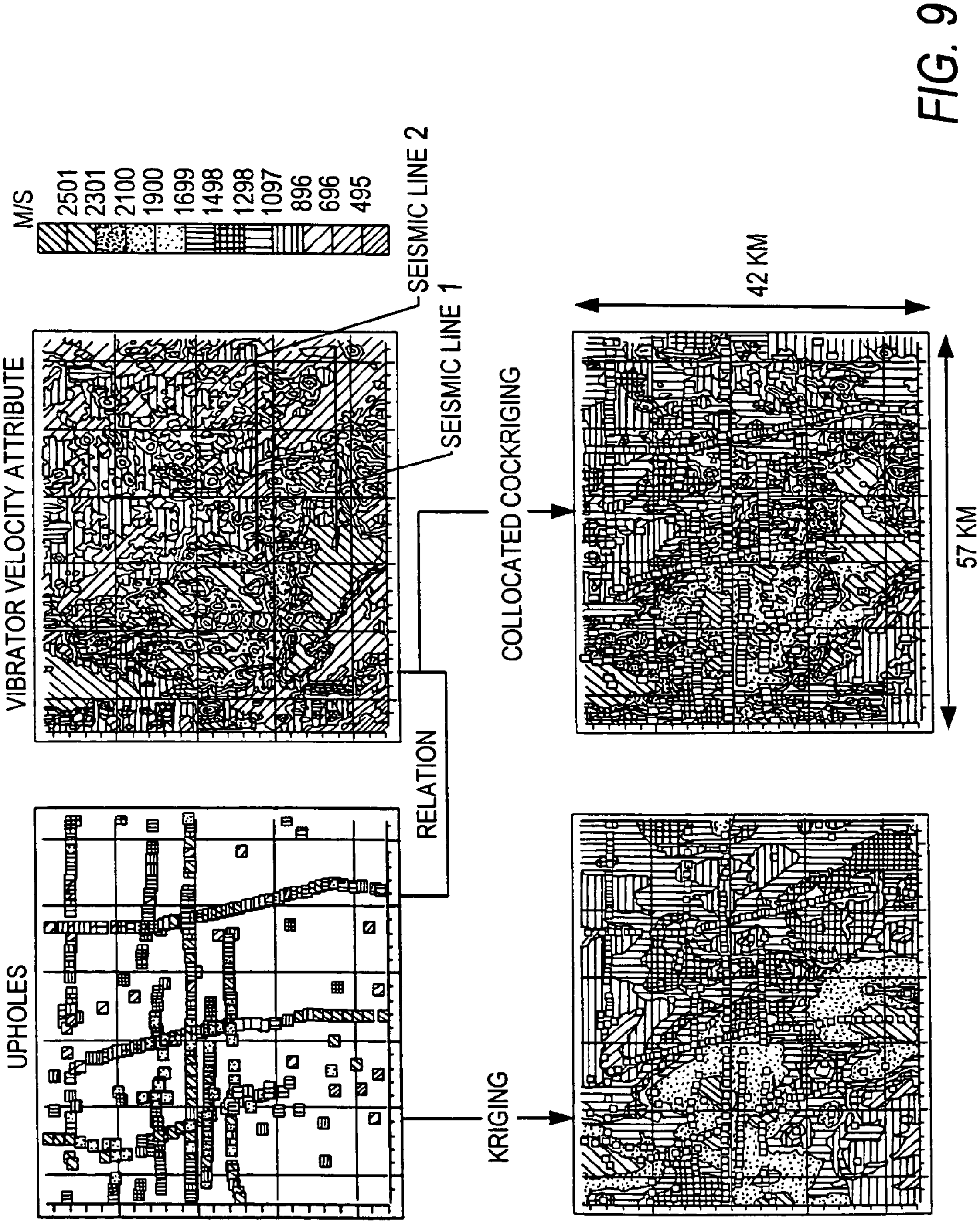
FIG. 9 illustrates near-surface velocity model building using geostatistical interpolation and integration in accordance with the present invention.

A 3D near-surface velocity model was built from surface to the SRD for subsequent seismic statics calculation. The first model (3D kriged model) was produced using 3D kriging of uphole data. Uphole data were loaded to the 3D kriging engine as interval or average velocity logs. Therefore, all uphole samples contributed to the model regardless of their penetration depths. The second model (integrated model) was produced by integration of uphole velocity using collocated cokriging with the velocity attribute derived from vibrator ground parameters down to 50 meters below surface and then combined with velocities from the first model down to the SRD (FIG. 9). The 50 meter penetration depth of vibrator data was estimated based on numerical correlation between uphole and derived velocity attribute data.

Step 5) Data and VALVE Model Consistency Checks

Figure 10:
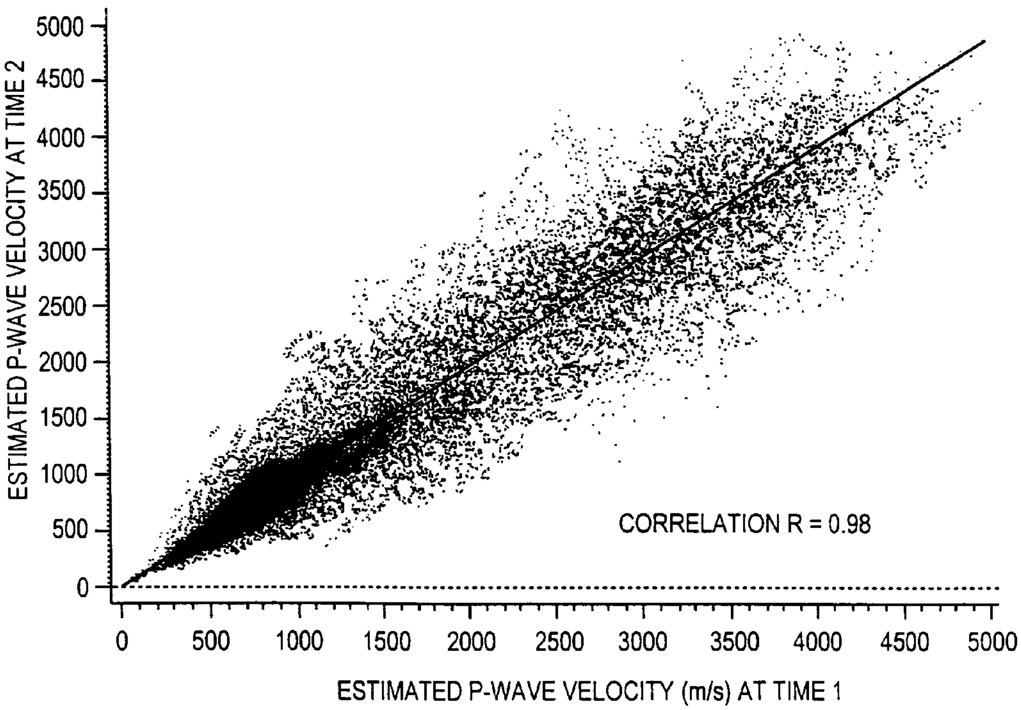
FIG. 10 is a crossplot of derived velocity estimates measured independently at different times.
Figure 11:
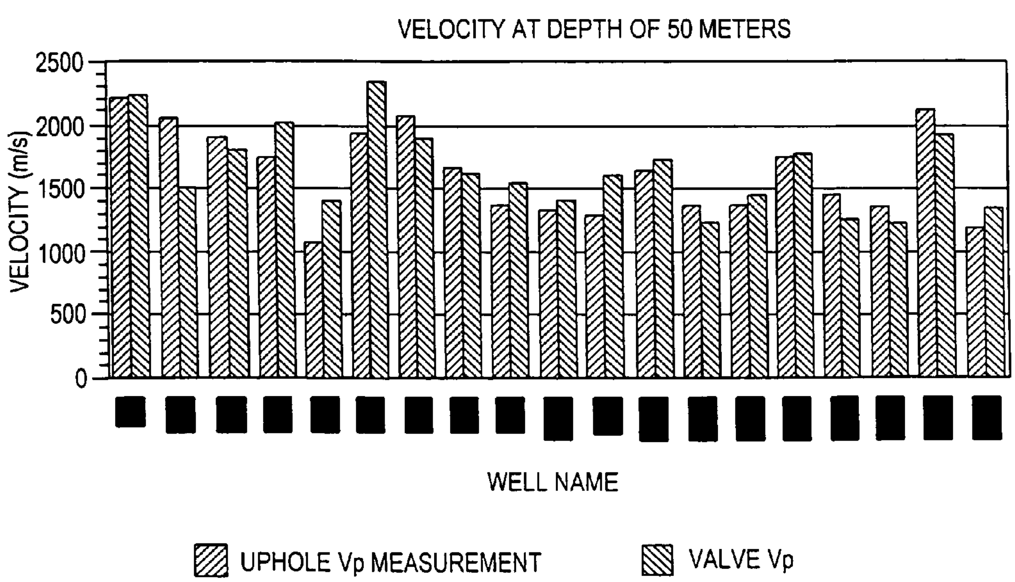
FIG. 11 is a comparison between VALVE and measured uphole velocities.

Vibrator performance control data provide indications about the interaction between vibrator and ground. Therefore, it is prudent to investigate their repeatability over time. FIG. 8 shows that VP's along the north-south lines are acquired twice at different times. Therefore, this data set can be used to make a repeatability experiment. FIG. 10 shows a cross-plot of the derived velocity estimates measured independently two times. The horizontal axis of this plot represents measurements made at time 1 and the vertical axis represents measurements at time 2. There is a strong repeatability with a very high correlation coefficient. This further supports the validity of these measurements and their primary relations to the ground physical properties.

It can be observed from FIG. 9 that, besides honoring the uphole data, the integrated velocity map also honors the features of the P-wave velocity attribute map. This gives the map a great deal of detail compared to a smoother map obtained using kriging of uphole data.

Figure 12:
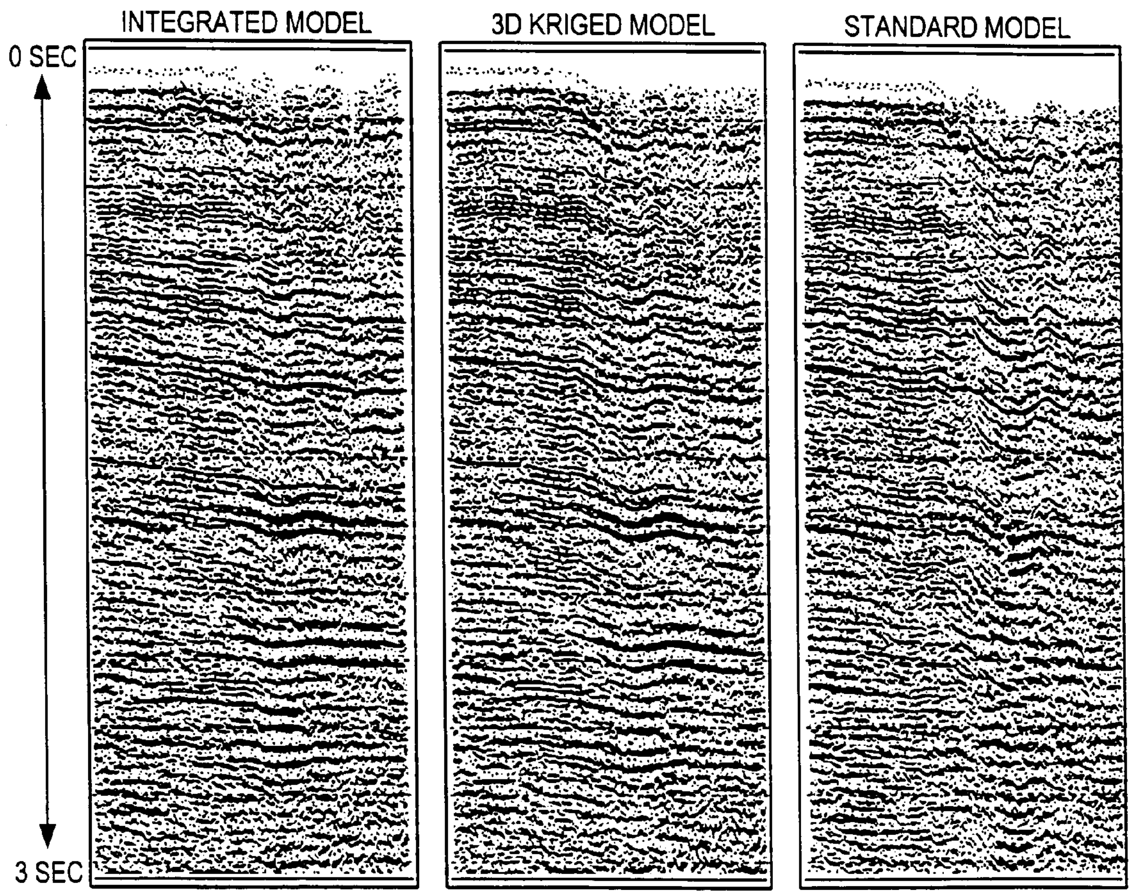
FIG. 12 illustrates three seismic sections along a first line (30 kilometers).

Comparisons between the VALVE layer velocity model and the control upholes are shown in FIG. 12. This clearly shows that the VALVE model has effectively predicted near surface velocities in areas with missing measurements.

Application to Seismic Data Processing Static corrections (statics) are time shifts applied to seismic traces aiming to produce a time section that is as free as possible from poor imaging and apparent structural features resulting from topography and near surface geologic variations. Statics, which primarily require near-surface velocity for calculation, are of vital importance for seismic reflection data processing and interpretation in land and transition zone.

Figure 13:
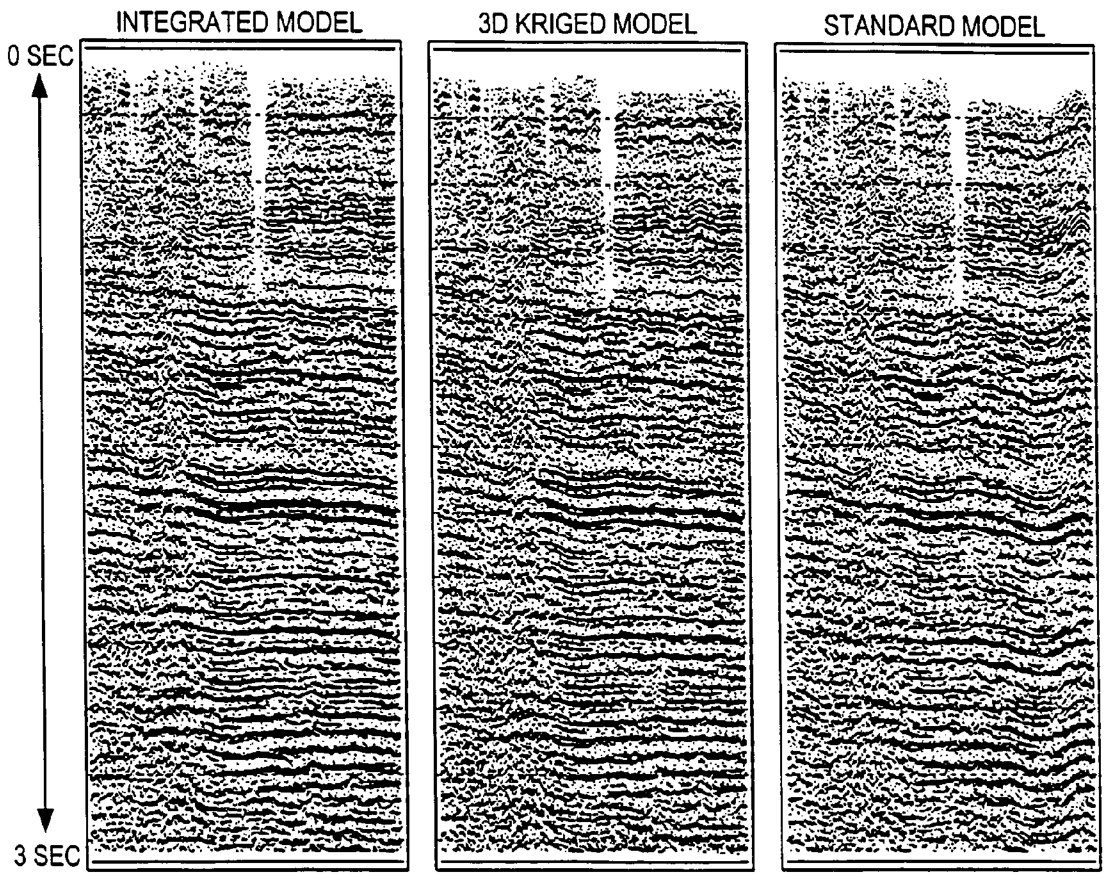
FIG. 13 illustrates three seismic sections along a second line (30 kilometers).
Figure 14:
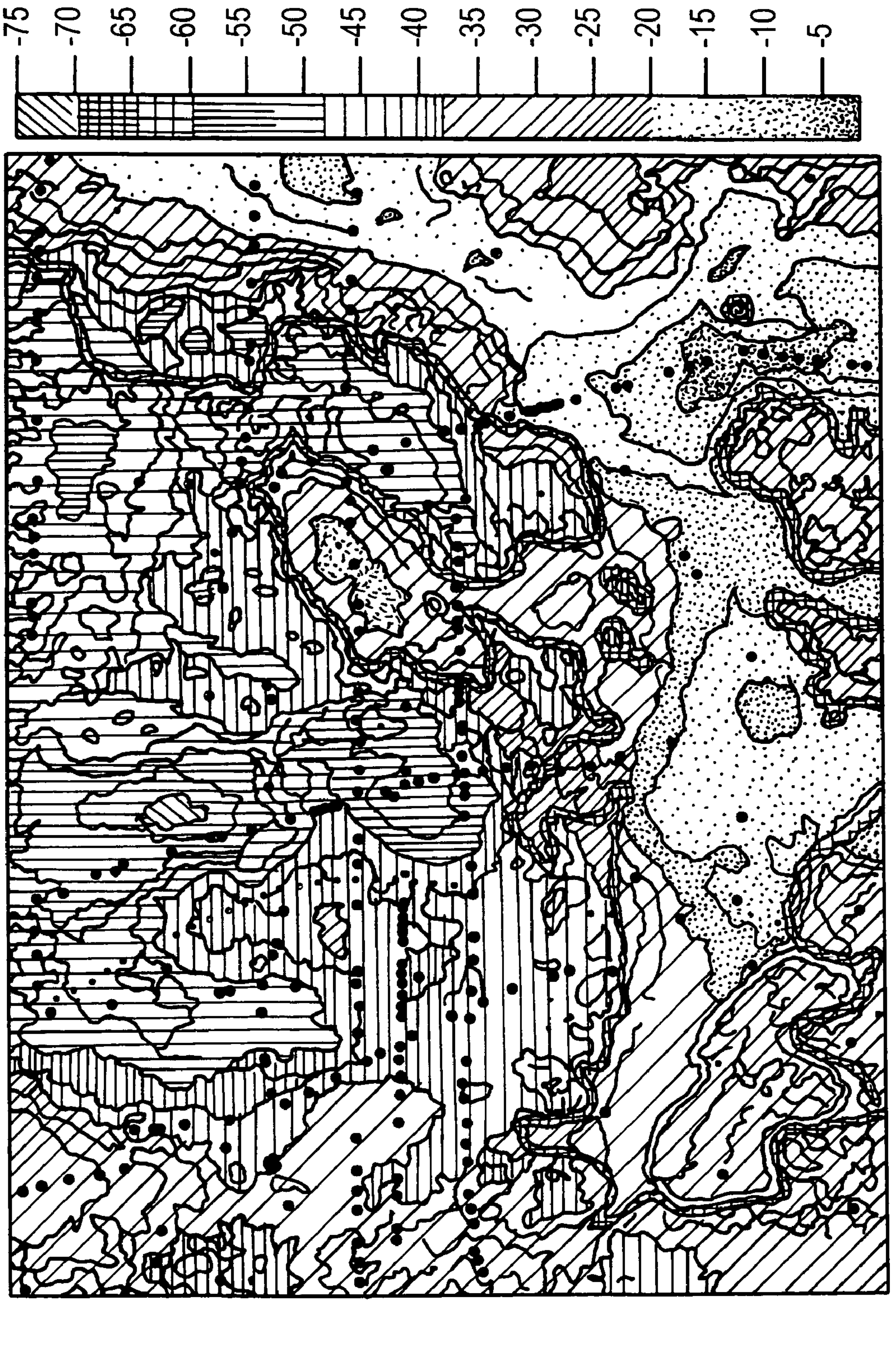
FIG. 14 shows the results of the 2-Layer model with real upholes posted.
Figure 15:
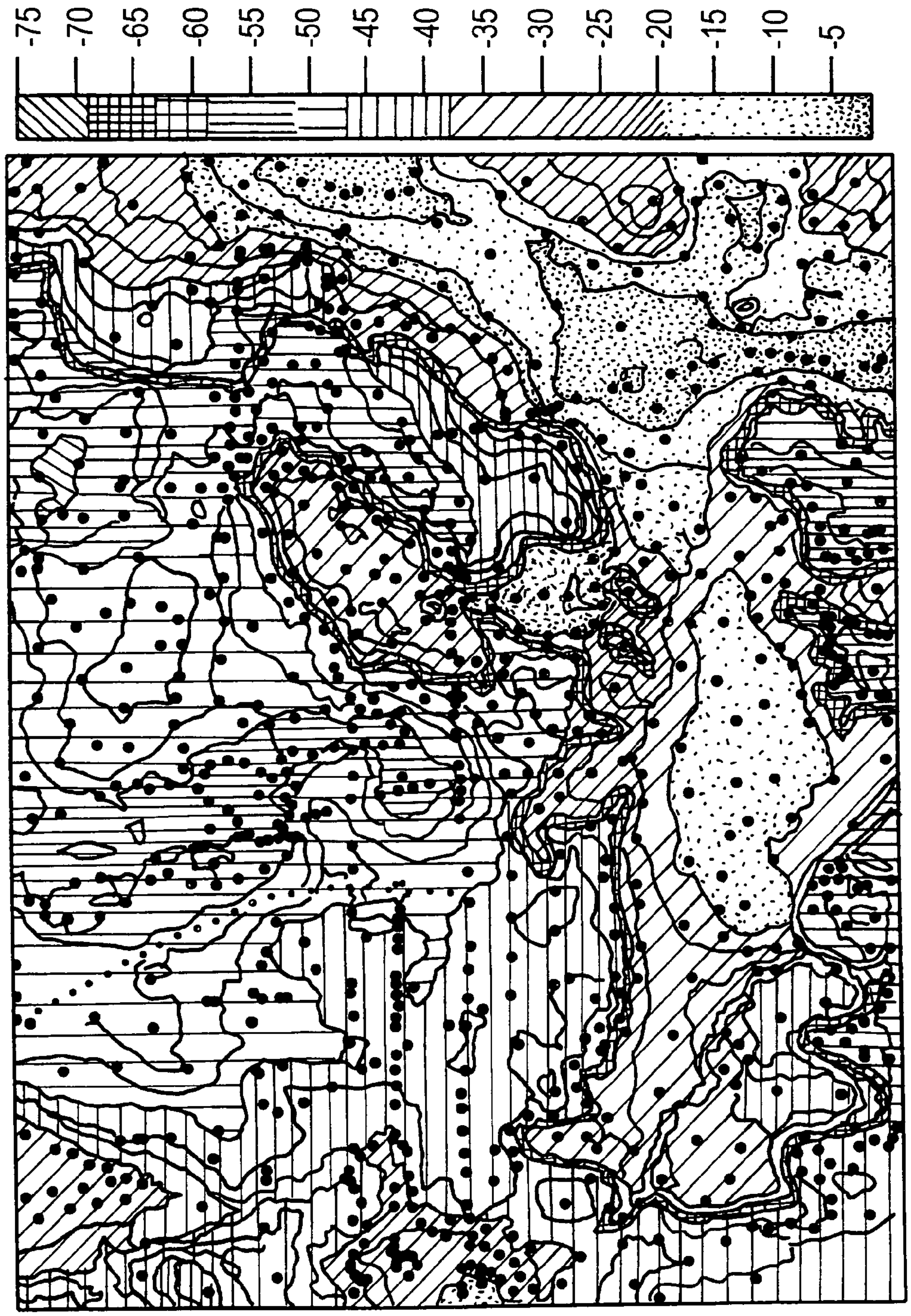
FIG. 15 shows the results of the 2-Layer model and geology incorporation with pseudo upholes posted. The contour interval is –5 ms.

The 3D kriged and the integrated models plus a standard near-surface model were used in stacking the seismic data. The standard model is built based on traditional interpolation between uphole average velocity measurements from surface to the SRD. FIGS. 12 and 13 each show three stacks for a seismic line stacked using the previously described three models. In both figures the standard model stack shows apparent problems of poor continuity and structures that propagate up to the surface as compared to the two geostatistical models. This is attributed to the limited number of upholes in the vicinity of these lines. On the other hand, the integrated model shows more improvements than the 3D kriged model. It handles the medium and long wavelengths statics better. This is due to the fact that the integrated model has more accurate definition of the changing velocity boundaries because it relies on a densely sampled related data.

A first conclusion was that geostatistical techniques proved to be useful in combining various types of data to estimate near surface velocity distributions. Honoring the spatial variability of the analyzed data allowed obtaining better velocity models as compared to the standard technique. The latter requires interpretation of the uphole data while the former does not, which in turn, reduces the turn around time required to build a near-surface velocity model.

Furthermore, using the VALVE technique, estimated P-wave velocity from vibrator measurements is introduced as an added attribute that can be used to improve determination of near surface velocity when it is integrated with uphole measurements. This attribute guides the area of influence of each uphole resulting in better handle of medium and long wavelength statics anomalies. The success obtained in the area outlined in this paper was followed by successful application of the VALVE technique in several other areas.

The seismic image also compared favorably with that obtained using statics based on an independently derived near-surface velocity model obtained at a much greater effort. On the basis of these results, the integrated model resolved statics problems better than models that individually utilize uphole data through geostatistical and conventional computation techniques.

Figure 16:
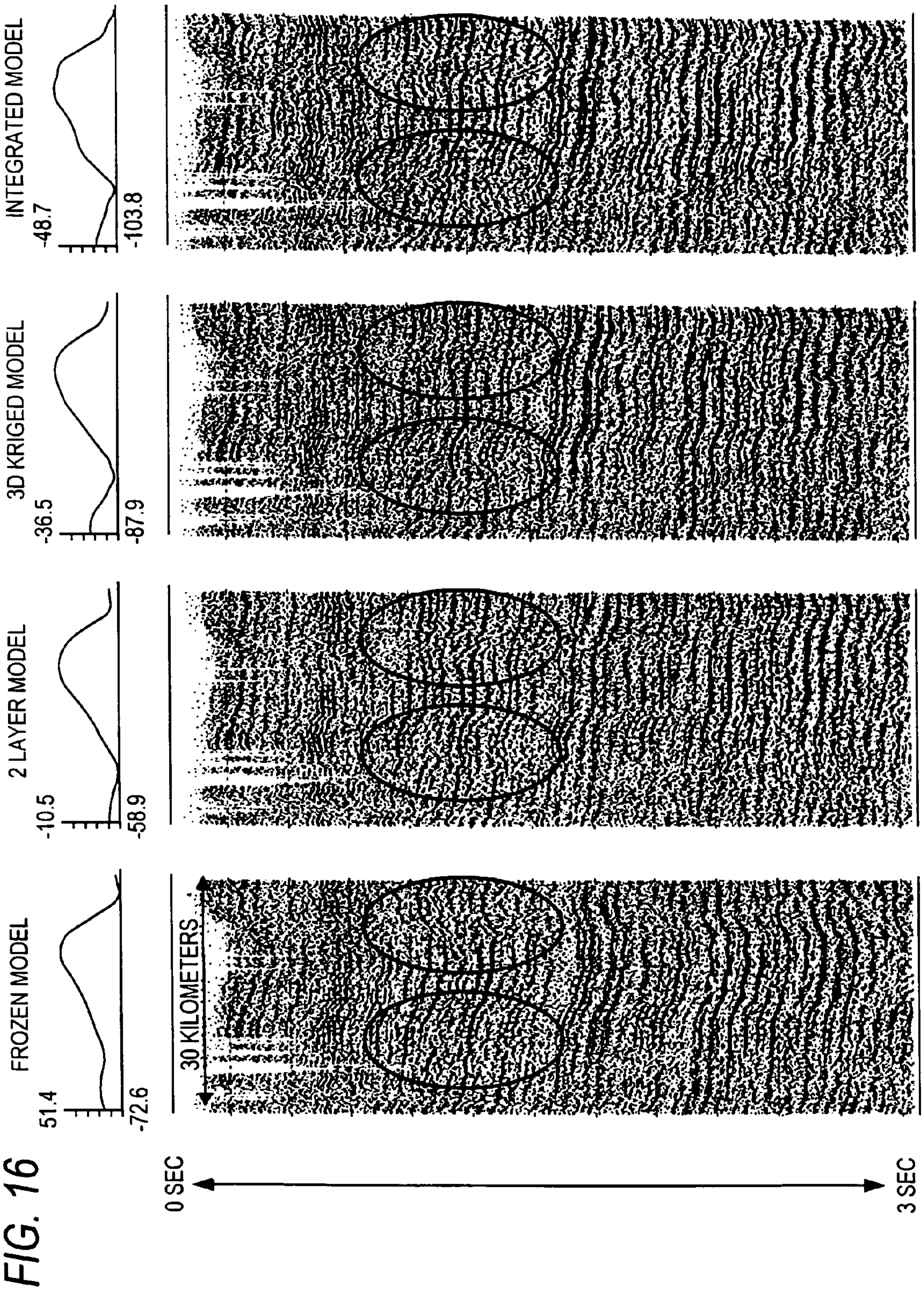
FIG. 16 shows a seismic section along line CS-5.

A study area was selected, as shown in FIG. 16, and seismic data from a portion of the study area were processed using four different statics models.

The first model constructed for this study used uphole data to construct a 15-layer 3D velocity model of the near surface using Ordinary Kriging from surface to Seismic Reference Datum (SRD). Then, travel times from surface to SRD were computed using this model.

The second model incorporated the velocity attribute derived from the vibrator measurements in accordance with the present invention. Average velocity from surface to five iso-depth layers was geostatistically computed using collocated cokriging of each iso-depth uphole velocity layer and the vibrator velocity attribute. Then, interval velocity was computed in five layers between the resulting velocity maps where each layer has a constant thickness of 10 meters. Following this step, travel times were computed for this 50 meter earth's thickness using the integrated model. Travel times from 50 meters below surface to the SRD were computed from uphole data only using 3D Ordinary Kriging.

A third model was called the "Frozen Model." This model was built based on uphole average velocity measurements from surface to the SRD. An average velocity map was constructed based on uphole measurements that reach the SRD depth using conventional interpolation techniques such as least squares. Then this map was used to calculate statics by dividing thickness grip from surface to SRD by average velocity grid. This method did not utilize upholes which do not reach the SRD. It also produced unsatisfactory results when SRD goes above surface and when low velocity layers go deeper than SRD.

The fourth statics model was called the "2-Layer Model." This model relied on estimating the depth of the low near surface velocity based on uphole data. Any velocity lower than 1,800 m/s was considered to be low. Then high velocities were measured from uphole data to determine the amount of localized time shifts from the depth of the low velocity layer to the SRD. These shifts can be applied if SRD is above or below surface. However, in the study area this approach did not sufficiently resolve the statics problems.

Therefore, an approach that relied on integrating the 2-Layer Model with the geology of the area was utilized. This method required addition of about 400 pseudo upholes to the study area in order to control velocity estimation whenever needed.

Figure 17:
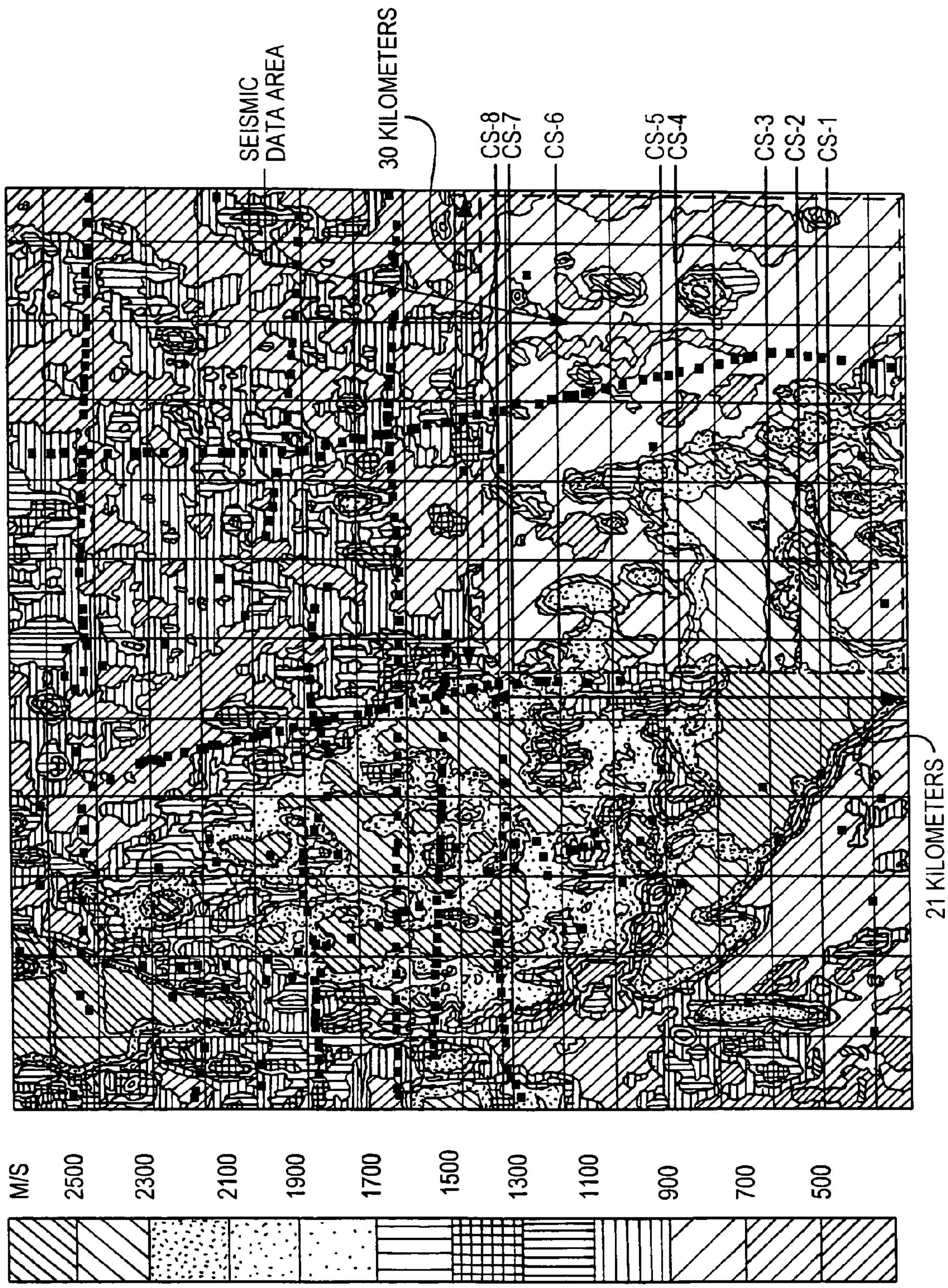
FIG. 17 is a basemap exhibiting the processed seismic data area and locations of the seismic sections. The background map shows the estimated P-wave velocity from vibrators.
Figure 18:
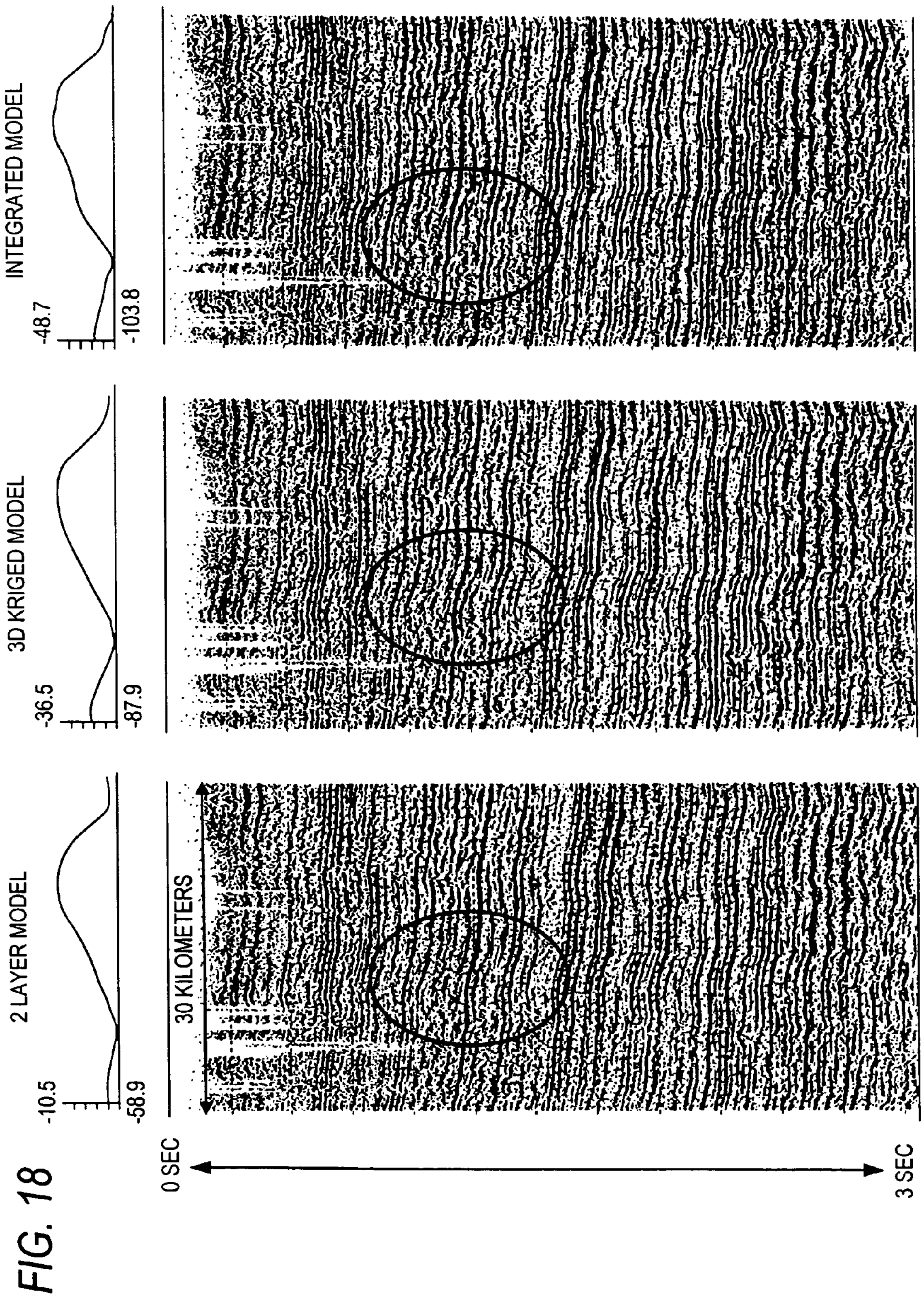
FIG. 18 shows three seismic sections obtained from the three statics models after the application of automatic statics.

FIG. 17 shows the density of the real upholes, and FIG. 18 shows the density of the added pseudo upholes. As can be inferred, this method required a lot of interpretation and human intervention. It also required several iterations before converging to an acceptable model. Every iteration required model building followed by application of this model to stack the seismic data, which resulted in a lengthy time period requiring manpower and computer time.

The SRD used in building the geostatistical models was 50 meters below Saudi Aramco's SRD to avoid the case when SRD goes above surface.

FIG. 19 shows a seismic section along line CS-5. Four stacks of this line were produced using the previously described four models. The Frozen Model's stack seems to be poor compared to the other models. The 2-Layer Model produced results that are comparable to the results obtained from the 3D kriged model.

The integrated model showed more improvements than the 2-Layer Model and the 3D kriged model. It handled the medium and long wavelengths statics better. Automatic statics was performed using these statics models excluding the Frozen Model.

FIG. 20 shows three seismic sections obtained from the three statics models after the application of automatic statics. It is apparent that better results are obtained from the integrated model.

While the disclosed method has been particularly shown and described with respect to the preferred embodiments, it is understood by those skilled in the art that various modifications in form and detail may be made therein without departing from the scope and spirit of the invention. Accordingly, modifications such as those suggested above, but not limited thereto are to be considered within the scope of the invention, which is to be determined by reference to the appended claims.

I claim:

1. A method of improving the estimation of P-wave velocity in a near-surface region of a land area, comprising:

a first step of gathering vibrator dynamic data generated in the near-surface region in response to vibrator action on the land area;

a second step of deriving a P-wave velocity attribute from the vibrator dynamic data; and a third step of estimating the P-wave velocity using the P-wave velocity attribute to interpolate between sparse velocity measurement points from an uphole data collection technique.

2. The method of claim 1, wherein the vibrator dynamic data includes both the ground stiffness data and the ground viscosity data.

3. The method of claim 1, wherein the vibrator dynamic data includes P-wave velocity information which is derived by the steps of calculating shear wave propagation velocity information from the ground stiffness data and the ground viscosity data and then calculating the P-wave velocity information from the calculated shear wave propagation velocity information in combination with an estimate of Poisson's ratio.

4. The method of claim 1, further comprising an initial step of selecting the land area such that the land area includes adequate upholes to ensure good statistical representation of the selected land area near surface variations.

5. The method of claim 1, wherein said first step is conducted either with either a 2-dimensional seismic study in the land area, with a 3-dimensional seismic study in the land area, or as a stand-alone survey to obtain the vibrator dynamic data.

6. The method of claim 1, further comprising a step of gathering surface elevation information of the land area to be used in said third step.

7. The method of claim 1, wherein said third step includes the step of building either a 2-dimensional near-surface model or a 3-dimensional near-surface velocity model by the steps of:

deriving velocity attribute information from the vibrator dynamic data gathered in said first step;

obtaining velocity control points using the uphole data collection technique in said third step; and integrating the control velocity points using collocated cokriging with the velocity attribute information.

8. The method of claim 7, wherein said building step further includes the steps of:

building either an initial 2-dimensional near-surface velocity model or an initial 3-dimensional near-surface velocity model by 2-dimensional or 3-dimensional kriging, respectively, of the velocity control points to generate additional information; and using the additional information in said integrating step.

9. The method of claim 7, further comprising the step of computing seismic statics corrections to be used in seismic data processing to remove the effects of the rapidly varying near-surface velocity, thereby improving the 2-dimensional or 3-dimensional images of the earth subsurface.

10. The method of claim 7, further comprising the step of utilizing the integrated velocity models for estimating the P-wave velocity using a technique requiring a knowledge of a near-surface velocity model.

11. A method of estimating P-wave velocity in a near-surface region of a land area, comprising:

a first step of gathering control data for the near-surface region;

a second step of gathering vibrator dynamic data generated in the near-surface region in response to vibrator action on the land area; and a third step of estimating the P-wave velocity in response to both the control data and the vibrator dynamic data;

wherein the vibrator dynamic data includes at least one of ground stiffness data and ground viscosity data.

12. The method of claim 11, wherein the vibrator dynamic data includes both the ground stiffness data and the ground viscosity data.

13. The method of claim 12, wherein the vibrator dynamic data includes P-wave velocity information which is derived by the steps of calculating shear wave propagation velocity information from the ground stiffness data and the ground viscosity data and then calculating the P-wave velocity information from the calculated shear wave propagation velocity information in combination with an estimate of Poisson's ratio.

14. The method of claim 12, further comprising an initial step of selecting the land area such that the land area includes adequate upholes to ensure good statistical representation of the selected land area near surface variations.

15. The method of claim 12, wherein said first step includes the step of uphole data preparation and quality assessment.

16. The method of claim 12, wherein said second step includes the step of conducting a 3-dimensional seismic study in the land area.

17. The method of claim 12, further comprising a step of gathering surface elevation information of the land area to be used in said third step.

18. The method of claim 11, wherein said first and second steps may be perfonned in any order and/or at least partially concurrently.

19. The method of claim 11, wherein the control data gathered in said first step is seismic data based upon waves in the near-surface region generated in response to a shock in each of a plurality of upholes drilled in the land area.

20. The method of claim 19, wherein said first and second steps may be performed in any order and/or at least partially concurrently.

21. A method of estimating P-wave velocity in a near-surface region of a land area, comprising:

a first step of gathering control data for the near-surface region;

a second step of gathering vibrator dynamic data generated in the near-surface region in response to vibrator action on the land area; and a third step of estimating the P-wave velocity in response to both the control data and the vibrator dynamic data;

wherein said third step includes the step of building a 3-dimensional near-surface velocity model by the steps of:

deriving uphole velocity information from the seismic data gathered in said first step;

deriving velocity attribute information from the vibrator dynamic data gathered in said second step; and integrating the uphole velocity information using collocated cokriging with the velocity attribute information.

22. The method of claim 21, wherein said building step further includes the steps of:

building an initial 3-dimensional near-surface velocity model by 3-dimensional kriging of the uphole velocity information to generate additional information; and using the additional information in said integrating step.

23. The method of claim 21, further comprising the step of applying static corrections to results from said integrating step.

24. A method of estimating P-wave velocity in a near-surface region of a land area, comprising:

a first step of gathering control data for the near-surface region;

a second step of gathering vibrator dynamic data generated in the near-surface region in response to vibrator action on the land area; and a third step of estimating the P-wave velocity in response to both the control data and the vibrator dynamic data;

wherein the control data gathered in said first step is seismic data based upon waves in the near-surface region generated in response to a shock in each of a plurality of upholes drilled in the land area; and wherein the vibrator dynamic data includes at least one of ground stiffness data and ground viscosity data.

25. The method of claim 24, wherein the vibrator dynamic data includes both the ground stiffness data and the ground viscosity data.

26. The method of claim 25, wherein the vibrator dynamic data includes P-wave velocity information which is derived by the steps of calculating shear wave propagation velocity information from the ground stiffness data and the ground viscosity data and then calculating the P-wave velocity information from the calculated shear wave propagation velocity information in combination with an estimate of Poisson's ratio.

27. The method of claim 25, further comprising an initial step of selecting the land area such that the land area includes adequate upholes to ensure good statistical representation of the selected land area near surface variations.

28. The method of claim 25, wherein said first step includes the step of uphole data preparation and quality assessment.

29. The method of claim 25, wherein said second step includes the step of conducting a 3-dimensional seismic study in the land area.

30. The method of claim 25, further comprising a step of gathering surface elevation information of the land area to be used in said third step.

31. A method of estimating P-wave velocity in a near-surface region of a land area, comprising:

a first step of gathering control data for the near-surface region;

a second step of gathering vibrator dynamic data generated in the near-surface region in response to vibrator action on the land area; and a third step of estimating the P-wave velocity in response to both the control data and the vibrator dynamic data;

wherein the control data gathered in said first step is seismic data based upon waves in the near-surface region generated in response to a shock in each of a plurality of upholes drilled in the land area; and wherein said third step includes the step of building a 3-dimensional near-surface velocity model by the steps of:

deriving uphole velocity information from the seismic data gathered in said first step;

deriving velocity attribute information from the vibrator dynamic data gathered in said second step; and integrating the uphole velocity information using collocated cokriging with the velocity attribute information.

32. The method of claim 31, wherein said building step further includes the steps of:

building an initial 3-dimensional near-surface velocity model by 3-dimensional kriging of the uphole velocity information to generate additional information; and using the additional information in said integrating step.

33. The method of claim 31, further comprising the step of applying static corrections to results from said integrating step.

* * * * *